United States Patent [19]
Patel

[11] Patent Number: 6,003,435
[45] Date of Patent: Dec. 21, 1999

[54] COFFEE-MAKING MACHINE

[75] Inventor: Dahyabhai U. Patel, Vancouver, Canada

[73] Assignee: Cafe 98 Industries Ltd., St. Charles, Mo.

[21] Appl. No.: 09/210,955

[22] Filed: Dec. 15, 1998

Related U.S. Application Data

[60] Provisional application No. 60/069,829, Dec. 16, 1997.

[51] Int. Cl.⁶ ..................................................... A47J 31/00
[52] U.S. Cl. ................................. 99/283; 99/305; 99/307
[58] Field of Search ............................. 99/283, 305, 307, 99/280

[56] References Cited

U.S. PATENT DOCUMENTS 5,063,836  11/1991  Patel ....................................... 99/307 X
5,195,422   3/1993  Newnan ..................................... 99/283

*Primary Examiner*—Reginald L. Alexander
*Attorney, Agent, or Firm*—Fitzpatrick, Cella, Harper & Scinto

[57] ABSTRACT

A coffee-making machine of the type to deliver hot water during a brewing cycle to ground coffee supported in a removeable filter unit includes a heated reservoir for water heating and storage and a sprayhead to deliver heated water from the reservoir to the filter unit. A first valved conduit is actuable to deliver a first amount of heated water from the reservoir to the sprayhead and a second valved conduit is actuable to deliver a second amount of heated water from the reservoir to the sprayhead. Selection switches allow an operator to select an amount of coffee to be brewed. A controller is in communication with the selection switches and controls actuation of the first and second valved conduits during a brewing cycle to deliver an appropriate amount of heated water to the sprayhead for delivery to ground coffee in the filter unit thereby to brew the selected amount of coffee.

9 Claims, 3 Drawing Sheets

COFFEE-MAKING MACHINE

This application claims benefit of Provisional Application No. 60/069,829, filed Dec. 16, 1997.

FIELD OF THE INVENTION

The present invention relates to coffee-making machines of the type to deliver hot water to ground coffee contained in a filter, to brew pots of coffee as required. More particularly, the present invention is directed to a coffee-making machine, which better regulates the amount of water contacting the coffee grounds during a brewing cycle.

BACKGROUND OF THE INVENTION

Conventional coffee-making machines commonly used in offices, restaurants and coffee shops are provided with a water reservoir, a heating element in the reservoir and various heat and flow controls so that an appropriate quantity of hot water is available for coffee brewing purposes. The ground coffee is contained in a removable filter unit disposed below a sprayhead in fluid communication with the hot water reservoir. When it is desired to brew a pot of coffee, hot water from the reservoir is delivered to the sprayhead and then onto the ground coffee contained in the filter unit.

Most coffee-making machines of this nature have a single valve, which controls the amount of water delivered from the hot water reservoir to the sprayhead. For example, U.S. Pat. No. 5,063,836 to Patel, assigned to the assignee of the present invention, discloses a coffee-making machine having a single valve controlling the flow of hot water from the hot water reservoir to the sprayhead. The duration of time the valve remains open is regulated by a timer. The valve is kept open longer when larger amounts of coffee are to be brewed. Therefore, depending on the amount of coffee to be brewed, the coffee grounds are exposed to hot water from the sprayhead for different durations. It has been found that exposing coffee grounds to hot water for different durations sometimes yields inconsistent coffee.

Still other types of coffee-making machines have employed a bypass method for delivering varying amounts of water onto the coffee grounds. Depending on the amount of coffee to be brewed, some of the water exiting the hot water reservoir bypasses the coffee grounds to avoid contact therewith. While this maintains the water contact time with the coffee grounds generally constant for different amounts of brewed coffee, not all of the water exiting the hot water reservoir contacts the coffee grounds. As a result, uneven extraction of the coffee grounds occurs leading again to a varying quality of brewed coffee.

It is therefore an object of the present invention to provide a novel coffee-making machine, which obviates or mitigates the above-identified disadvantage.

SUMMARY OF THE INVENTION

According to one aspect of the present invention there is provided a coffee-making machine of the type to deliver hot water during a brewing cycle to ground coffee supported in a removeable filter unit, said coffee-making machine comprising:

a heated reservoir for water heating and storage;

a sprayhead to deliver heated water from said reservoir to said filter unit;

a first valved conduit actuable to deliver a first amount of heated water from said reservoir to said sprayhead;

a second valved conduit actuable to deliver a second amount of heated water from said reservoir to said sprayhead;

selection means to allow an operator to select an amount of coffee to be brewed; and a controller in communication with the selection means and controlling actuation of said first and second valved conduits during a brewing cycle to deliver an appropriate amount of heated water to said sprayhead for delivery to ground coffee in said filter unit thereby to brew the selected amount of coffee.

Preferably, the controller actuates a selected one or both of the first and second valved conduits in response to the selection means. It is also preferred that the first and second amounts are different. It is further preferred that the first and second valved conduits are adjustable to alter the first and second amounts.

During actuation of the first and/or second valved conduits, it is preferred that the valved conduits remain open for the same amount of time during the brewing cycle. Preferably, each of the first and second valved conduits includes a solenoid-actuated valve connected to the reservoir by a first conduit and connected to the sprayhead by a second conduit.

In one embodiment, the selection means includes a pair of switches on a control panel of the coffee-making machine. Each switch is associated with a respective one of the first and second valved conduits. The controller actuates the first and/or second valved conduits during the brewing cycle in response to actuation of the respective switches.

According to another aspect of the present invention there is provided during a coffee-making process, a method for delivering hot water to ground coffee comprising the steps of:

determining the amount of coffee to be brewed during a brewing cycle in response to operator input; and actuating one or more valved conduits extending between a reservoir holding heated water and a sprayhead disposed over a basket of ground coffee depending on the determined amount of coffee to be brewed during said brewing cycle.

The present invention provides advantages in that during the brewing cycle all of the water exiting the hot water reservoir is delivered by the sprayhead to the ground coffee resulting in even extraction. In addition, the ground coffee is exposed to the hot water exiting the sprayhead for basically the same amount of time regardless of the amount of coffee being brewed. This helps to ensure high quality, consistent brewed coffee.

BRIEF DESCRIPTION OF THE DRAWINGS

A preferred embodiment of the present invention will now be described more fully with reference to the accompanying drawings in which.

DETAILED DESCRIPTION OF THE PREFERRED EMBODIMENT

Figure 1:
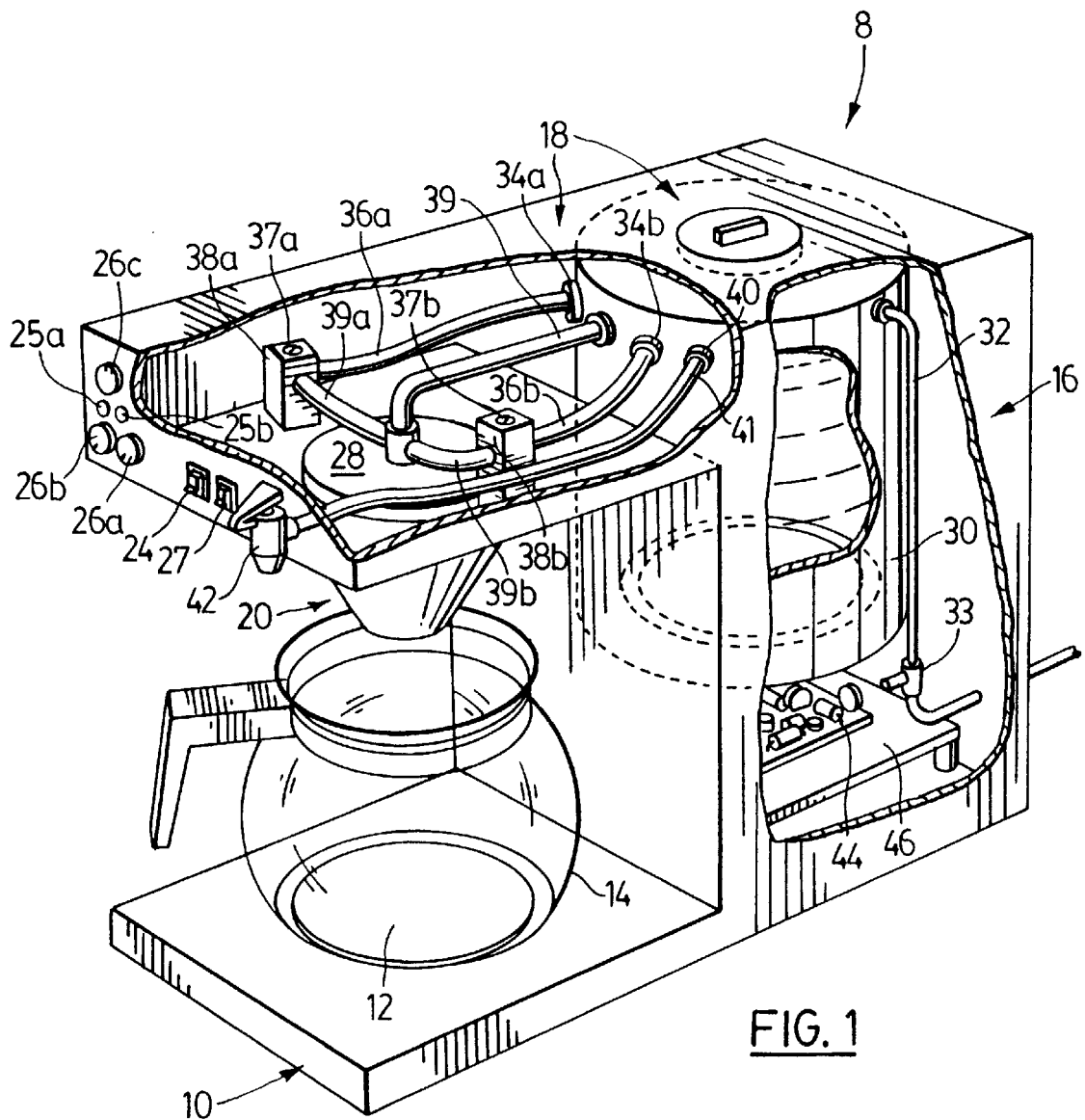
FIG. 1 is a perspective view, partially cut away, of a coffee-making machine in accordance with a preferred embodiment of the present invention.

Referring now to FIG. 1, a coffee-making machine in accordance with the present invention is shown and is generally indicated to by reference numeral 8. The coffee-making machine 8 has a base 10 provided with a warming plate 12 on which a coffee pot 14 can rest. Coffee-making machine 8 also has a column 16 in which most of its operating parts are mounted. A head 18 overlies the base 10 and removably supports a filter basket 20 accommodating a filter filled with ground coffee. The front control panel 22 of the head 18 has a brew switch 24 for manual actuation of a brewing cycle, an on-off switch 27, an on-off indicator light 26a, a temperature indicator light 26b, a sensor failure light 26c and full and half brew selection switches 25a and 25b respectively. Selection switches 25a and 25b allow an operator to select the desired amount of coffee to be brewed. A hot water outlet in the form of a sprayhead 28 is provided in the head 18 in the vicinity of the filter basket 20. The sprayhead 28 is similar in construction to that described in co-pending U.S. application Ser. No. 08/899,894, filed on Jul. 24, 1997 for an invention entitled "Brew Basket For Coffee-Making Machine, the content of which is incorporated herein by reference.

The column 16 holds a water reservoir 30. Cold water from a mains water supply is fed to the reservoir 30 via inlet conduit 32. A solenoid-actuated valve 33 opens and closes the inlet conduit 32. The reservoir 30 has a first outlet 34a connected to a full brew solenoid actuated valve 38a by way of a conduit 36a. Solenoid actuated valve 38a is also connected to the sprayhead 28 by way of a conduit 39a. The reservoir 30 has a second outlet 34b connected to a half brew solenoid actuated valve 38b by way of a conduit 36b. Solenoid actuated valve 38b is also connected to the sprayhead 28 by way of a conduit 39b. Each of the solenoid-actuated valves 38a and 38b has a volume control adjustment 37a and 37b respectively, determining the amount of water which will flow through the solenoid actuated valve over its operating cycle. The reservoir 30 has a third outlet 40 connected to a manually operated faucet 42 projecting forwardly from the control panel 22 via a conduit 41. A pour-over conduit 39 extends from the reservoir 30 to the sprayhead 28.

Figure 2:
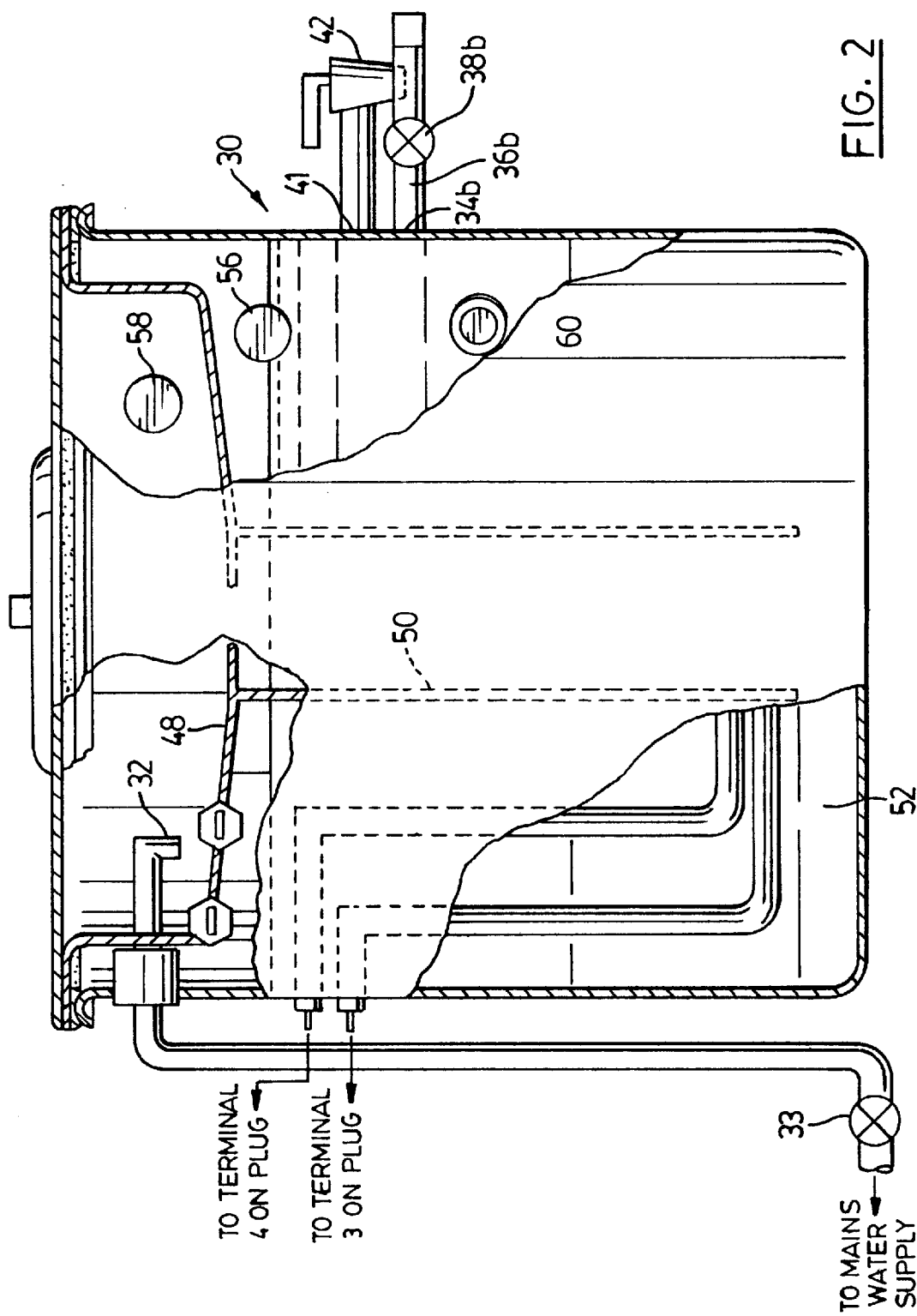
FIG. 2 is a diagrammatic partial sectional view of a hot water reservoir and associated parts forming part of the coffee-making machine of FIG. 1.
Figure 3:
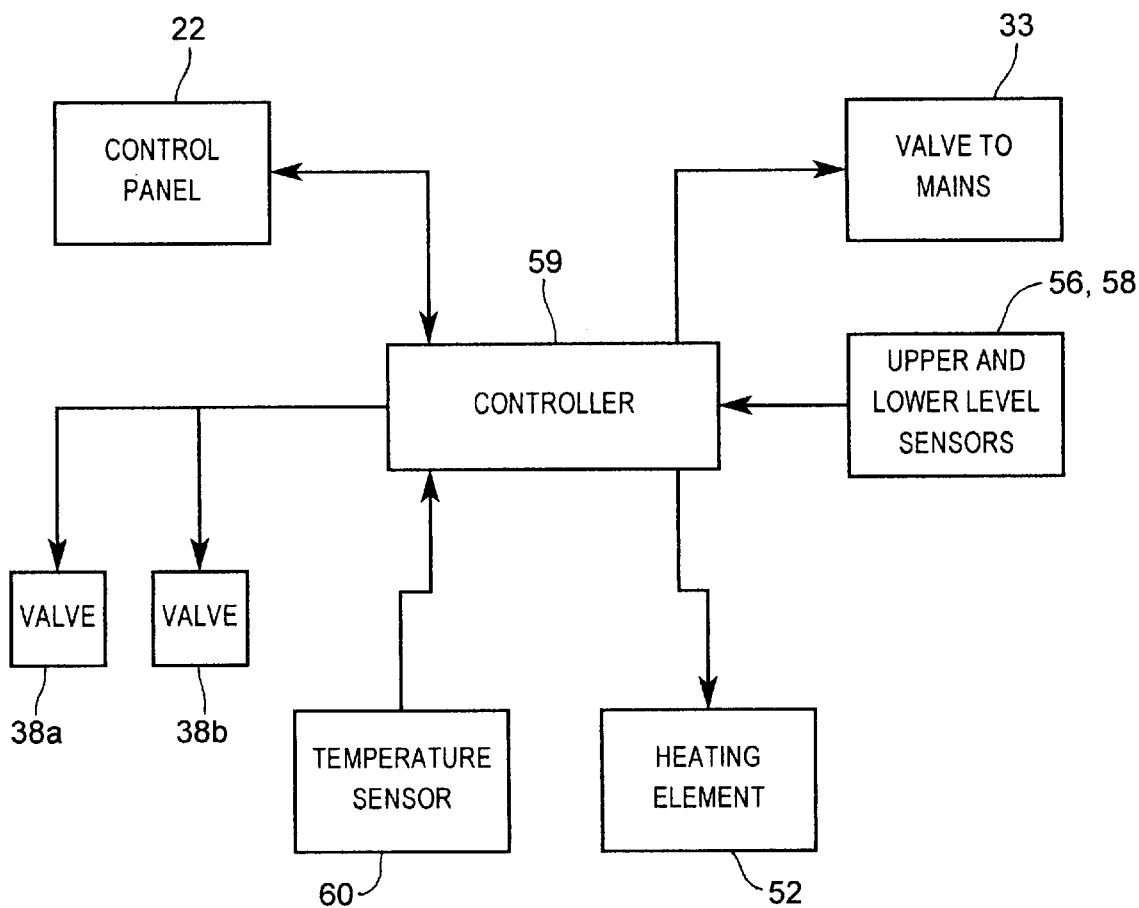
FIG. 3 is a schematic diagram in block form of an electronic control board forming part of the coffee-making machine of FIG. 1.

As can be seen from FIG. 2, the reservoir 30 has a top pan 48 with a central depending sleeve 50 protruding to the lower interior part of the reservoir. A heating element 52 is disposed close to the bottom of the reservoir interior. The exterior wall of the reservoir 30 is provided with a lower level metallic sensor probe 56 and an upper level metallic sensor probe 58. Sensor probes 56 and 58 sense the static level of the water in the reservoir 30. The sensor probes 56, 58, the heating element 52, the solenoid actuated valves 33, 38a and 38b, and the control panel 22 are electrically connected to a controller 59 mounted on a solid state circuit board 44 (see FIGS. 1 and 3). The reservoir 30 also contains a temperature sensing element in the form of a thermistor 60 electrically connected to the circuit board 44.

The solid state electronic circuit board 44 is supported on and electrically plugs into a base plate 46 within the column 16. Electrical connections are made from the control panel, valves and sensors to the base plate 46, and hence to the circuit board 44. The circuit board 44 can be manually unplugged from the base plate 46 readily and simply, for replacement purposes.

The operation of the coffee-making machine with the exception of the brewing cycle is similar to that described in U.S. Pat. No. 5,063,836 issued on Nov. 12, 1991, the content of which is incorporated herein by reference. Accordingly, only the brewing cycle operation of the coffee-making machine 8 will be described herein.

When an operator wishes to make brewed coffee, the amount of coffee to be brewed is selected using the selection switches 25a and 25b and the switch 24 is actuated to start the brewing cycle. The controller 59 communicates with the selection switches 25a and 25b and the brew switch 24 and in turn opens one or both of the solenoid actuated valves 38a and 38b for a predetermined amount of time depending on the amount of coffee to be brewed as selected using the selection switches. At this time, hot water is delivered from the reservoir 30 to the sprayhead 28 and finally to the ground coffee held in the filter basket 20. Thus, if the operator wishes to brew a full pot of coffee, selection switch 25a is selected before the brew switch 24 is actuated. In this manner, the controller 59 only actuates the full brew solenoid actuated valve 38a during the brewing cycle. Similarly, if the operator wishes to brew a half pot of coffee, selection switch 25b is selected before the brew switch 24 is actuated. In this manner, the controller 59 only actuates half brew solenoid actuated valve 38b during the brewing cycle. If the operator wishes to brew one and a half pots of coffee, both selection switches 25a and 25b are actuated before the brew switch 24 is actuated. This causes the controller 59 to open both solenoid-actuated valves 38a and 38b during the brewing cycle. In the present embodiment, solenoid actuated valve 38a allows one gallon of water to flow through it during the brewing cycle while solenoid actuated 38b valve allows one half of a gallon of water to flow through it during the brewing cycle.

As will be appreciated, the coffee-making machine 8 of the present invention allows an operator to select a desired amount of coffee to be brewed. Once the amount of coffee to be brewed has been selected and the brewing cycle has been started, all of the water exiting the reservoir 30 is delivered to the sprayhead 28 resulting in even extraction of the coffee grounds. Also, regardless of the amount of coffee to be brewed, the coffee grounds are exposed to the hot water for basically the same amount of time. This helps to yield high quality, consistent brewed coffee.

Although the solenoid actuated valves 38a and 38b have been described as allowing one and one half gallons of water to flow therethrough during the brewing cycle when both valves are actuated, those of skill in the art will appreciate that the amount of water flowing through the valves during the brewing cycle can be adjusted to suit particular needs. Also, although the coffee-making machine is shown delivering coffee into a coffee pot 14 on a warming plate, the warming plate can be removed. In this case it is preferred that coffee exiting the filter basket 20 is delivered to a thermal beverage server such as that described in U.S. Pat. No. 5,038,959 issued on Aug. 31, 1991.

Although a preferred embodiment of the present invention has been described herein in detail, it will be appreciated by those of skill in the art that variations and modifications may be made thereto without departing from the spirit and scope of the present invention as defined by the appended claims.

I claim:

1. A coffee-making machine of the type to deliver hot water during a brewing cycle to ground coffee supported in a removeable filter unit, said coffee-making machine comprising:

a heated reservoir for water heating and storage;

a sprayhead to deliver heated water from said reservoir to said filter unit;

a first valved conduit actuable to deliver a first amount of heated water from said reservoir to said sprayhead;

a second valved conduit actuable to deliver a second amount of heated water from said reservoir to said sprayhead;

selection means to allow an operator to select an amount of coffee to be brewed; and a controller in communication with the selection means and controlling actuation of said first and second valved conduits during a brewing cycle to deliver an appropriate amount of heated water to said sprayhead for delivery to ground coffee in said filter unit thereby to brew the selected amount of coffee.

2. A coffee-making machine as defined in claim 1 wherein said controller actuates a selected one or both of said first and second valved conduits in response to said selection means.

3. A coffee-making machine as defined in claim 2 wherein said first and second amounts are different.

4. A coffee-making machine as defined in claim 3 wherein said first and second valved conduits are adjustable to alter said first and second amounts.

5. A coffee-making machine as defined in claim 4 wherein during actuation of said first and second valved conduits, said valved conduits remain open for the same amount of time during said brewing cycle.

6. A coffee-making machine as defined in claim 5 wherein each of said first and second valved conduits includes a solenoid actuated valve connected to said reservoir by a first conduit and connected to said sprayhead by a second conduit.

7. A coffee-making machine as defined in claim 3 wherein said selection means includes at least one switch on a panel of said coffee-making machine, said at least one switch being actuable by an operator to select said amount of coffee to be brewed.

8. A coffee-making machine as defined in claim 7 wherein said selection means includes a pair of switches, each switch being associated with a respective one of said first and second valved conduits, said controller actuating said first and second conduits during said brewing cycle in response to actuation of said respective switches.

9. A coffee-making machine as defined in claim 4 wherein said first amount of heated water is generally equal to one gallon and wherein said second amount of heated water is generally equal to one half of a gallon.

* * * * *